United States Patent [19]

Wang

[11] Patent Number: 5,350,000

[45] Date of Patent: Sep. 27, 1994

[54] INFLATABLE MULTI-AIR-BAG COVER FOR CARS

[76] Inventor: S. B. Wang, 7F, No. 18, Hsin Kuo Road, Sanmin District, Kaohsiung City

[21] Appl. No.: 190,369

[22] Filed: Feb. 2, 1994

[51] Int. Cl.$^5$ .............................................. B65D 65/02
[52] U.S. Cl. .................... 150/166; 206/522; 296/136
[58] Field of Search .............. 150/166, 154, 167; 206/522; 296/136; 52/22.22, 2.23

[56]  References Cited

U.S. PATENT DOCUMENTS

| 4,044,867 | 8/1977 | Fisher | 206/522 X |
| 4,294,483 | 10/1981 | Ferris | 296/136 |
| 4,951,993 | 8/1990 | Taboada | 150/166 X |
| 5,242,206 | 9/1993 | Heck | 150/166 X |
| 5,287,904 | 2/1994 | Smith et al. | 150/166 |

FOREIGN PATENT DOCUMENTS

| 1106623 | 9/1957 | Fed. Rep. of Germany | 296/136 |
| 3629426 | 3/1988 | Fed. Rep. of Germany | 296/136 |
| 3928695 | 3/1991 | Fed. Rep. of Germany | 296/136 |
| 893600 | 12/1981 | U.S.S.R. | 296/136 |

Primary Examiner—Allan N. Shoap
Assistant Examiner—Christopher McDonald
Attorney, Agent, or Firm—Morton J. Rosenberg; David I. Klein

[57] ABSTRACT

Disclosed is an inflatable multi-air-bag cover for cars, consisting of a plurality of air bags which have two downward bent and extended sides and are parallelly arranged and connected by heat-seal to form a hood-like cover. Via an air tube passing through the heat-sealed portion of the air bags and pressure valves disposed within the heat-sealed portions, air is sent into the air bags to sequentially inflate the same. The inflated air bags together form the expanded hood-like cover to cover the roof and doors of the car while the cover can be used as a dust cover and a heat insulation. Moreover, the cover can be conveniently inflated and deflated with little or no effort of the user.

1 Claim, 7 Drawing Sheets

INFLATABLE MULTI-AIR-BAG COVER FOR CARS

BACKGROUND OF THE INVENTION

Due to limited indoor parking lots, most car owners would buy a canvas or plastic car cover for their cars so that the cars can be protected from dust, corrosion by acid rain, and over exposure to sunlight when they are parked outdoors. By this way, the cars may somewhat be kept in a better condition and have longer life. Most of the conventional car covers are useful in guarding against dust and can be folded for convenient storage. However, they are not effective in heat insulation. Moreover, it is somehow inconvenient for only one single man to spread a considerably big cover to completely cover the whole car.

It is therefore desirable to have a different kind of car cover for outdoor use which can be automatically extended in a convenient manner, be used as a heat insulation, and be easily stored without occupying large room.

SUMMARY OF THE INVENTION

It is therefore a primary object of the present invention to provide an inflatable multi-air-bag car cover which consists of a plurality of air bags arranged and mutually connected in parallel to form a hood-like cover with two downward bent sides. The bags can be inflated one by one from the first bag by means of an inner air tube passing through the air bags and a pressure valve provided on each air bag and thereby be completely spread to cover the car with only little or no effort of the user. The deflation and the folding of the air bags is easy and energy-saving while the collapsed cover can be conveniently stored with occupying only small room. Moreover, air in the bags gives excellent heat insulation effect to protect the car.

BRIEF DESCRIPTION OF THE DRAWINGS

The structure, features, and effects of the present invention can be best understood from the following detailed description of the preferred embodiment and the accompanying drawings, wherein.

DETAILED DESCRIPTION OF THE PREFERRED EMBODIMENT

Figure 1:
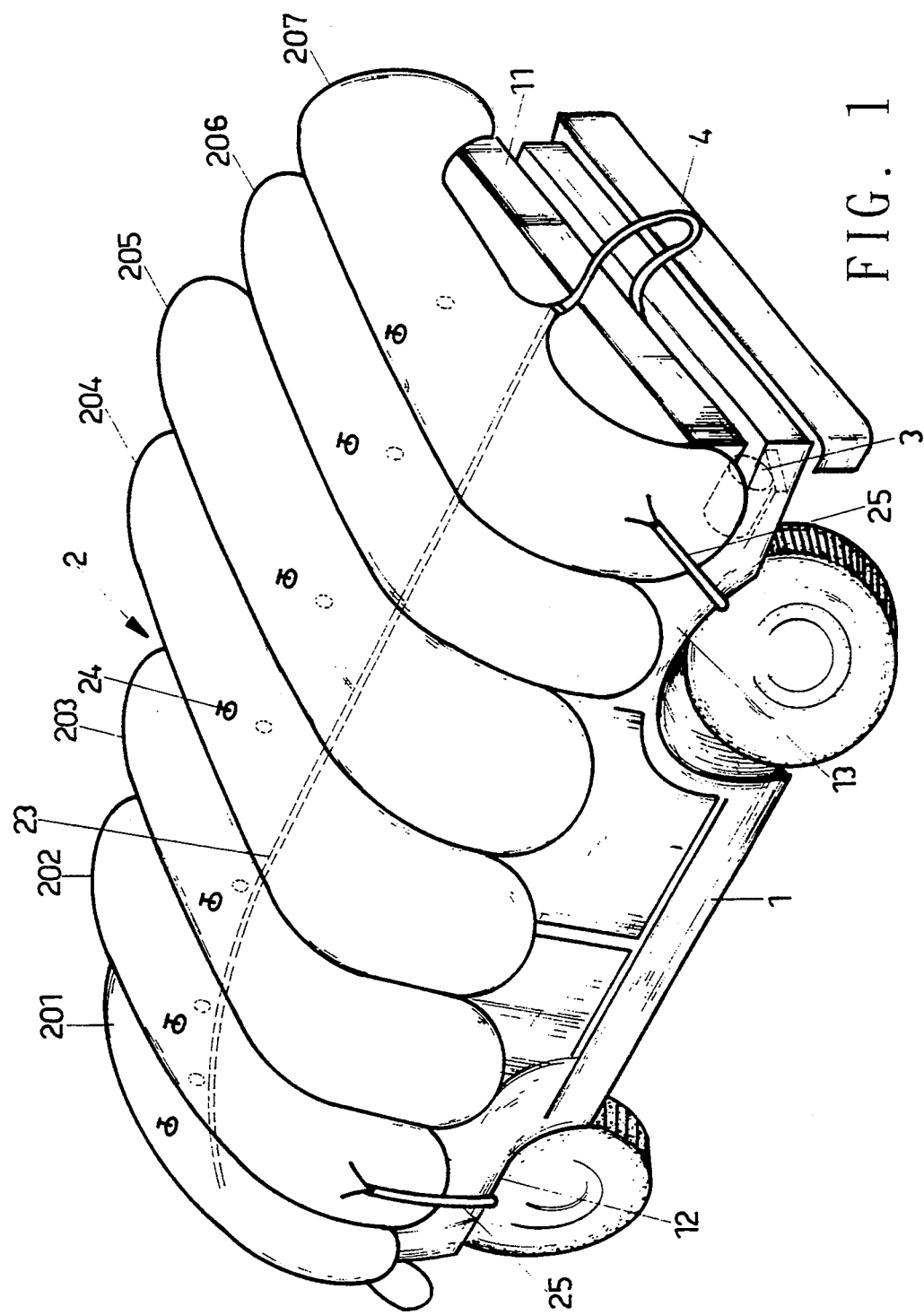
FIG. 1 is a perspective view showing a car covered with the inflatable multi-air-bag cover according to the present invention.

Please refer to FIG. 1 in which a car 1 with commonly known style is shown. The car 1 has a trunk 11, two front mudguards 12, and two rear mudguards 13. The present invention is a car-used cover 2 mainly consisting of a plurality of parallelly arranged and connected air bags. From the emobidment shown in FIG. 1, it can be seen that total seven pieces of cylindrical air bags 201, 202, 203, 204, 205, 206, and 207 are used to form a large hood-like cover. Each of the air bags has two downward bent and extended side portions and a straight central portion. The central portion each has a width substantially equal to the width of the car roof, and the side portions are downward bent at an angle preferably about 80 degrees so that they may fitly cover doors at two sides of the car.

Figure 2:
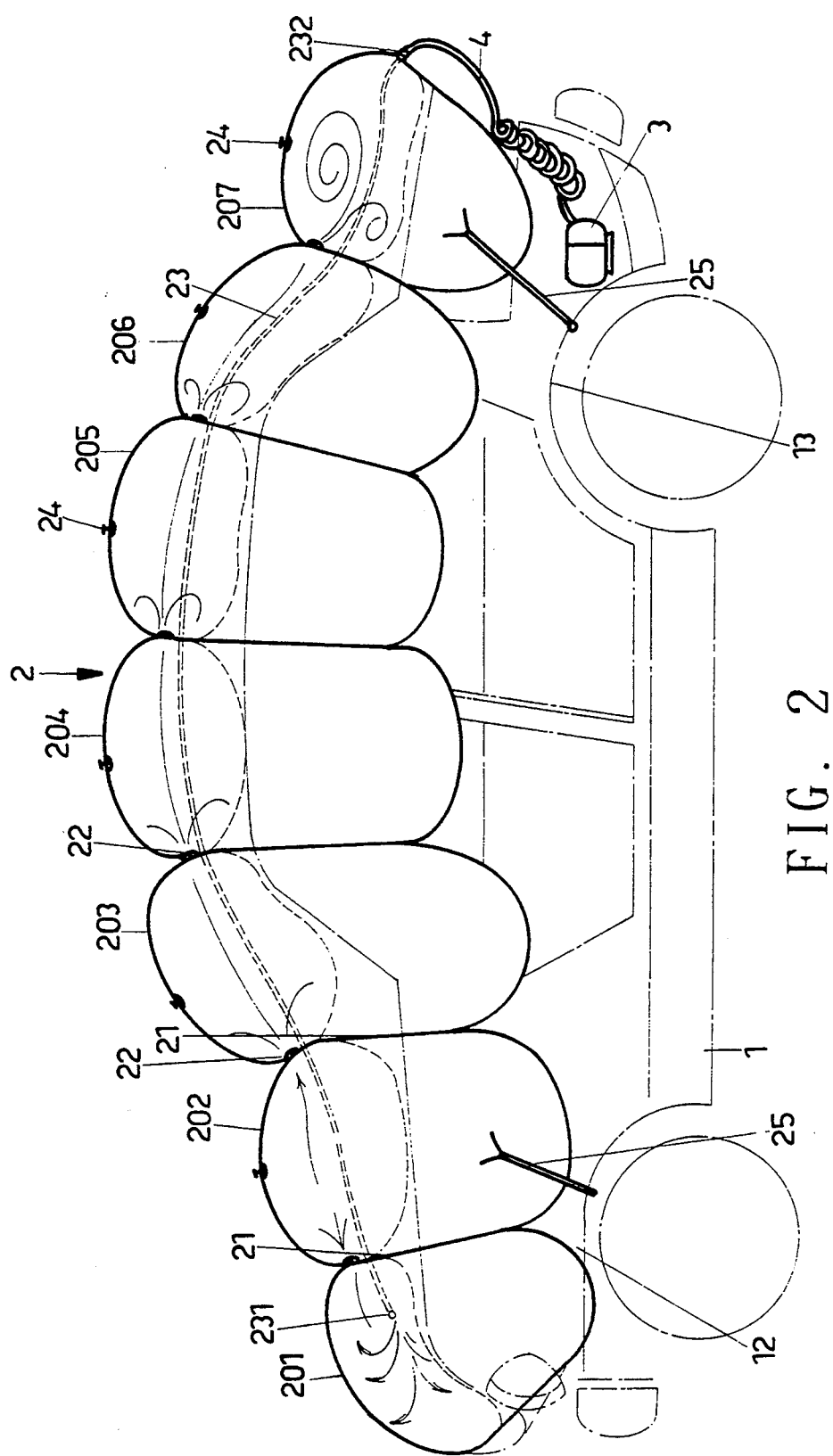
FIG. 2 is a side view of FIG. 1.

Please refer to FIGS. 1 and 2, the air bags 201 to 207 are mutually connected in sequence by heat-seal at some proper position 21 near their central point. A pressure valve 22 is provided within an area of each heat-sealed position 21. An air tube 23 is so provided that it extends from one rear side of a rear air bag 207, i.e. the 7th air bag, and passes through the heat-sealed positions 21 between each two air bags, and finally extends into a front air bag 201, i.e. the first air bag. That is, a free end opening 231 of the air tube 23 is located inside the front air bag 201 and the other end opening 232 thereof projects out of the rear end of the rear air bag 207. When inflation is done from the the exposed opening 232, air is first sent to the front air bag 201. A discharge valve 24 is provided on the surface of each air bag so that air inside the air bags 201 to 207 can be discharged from the discharge valves 24 to facilitate the collapse and folding of the cover 2. Fastening straps 25 are provided at two outer sides of the 7th and the 2nd air bags 207, 202, such that hooks connected to the free end of these fastening straps 25 may lock the fastening straps 25 to a lower edge of the two front and the two rear mudguards 12, 13.

The hood-like cover 2 with two bent sides can be made of plastic sheet, thin rubber cloth and the like, which is processed to form the cylindrical air bags. When the air bags connected by heat-seal are inflated with air, a certain distance exists between an upper and a lower surfaces of the cover 2, and therefore, provides the heat insulation effect to prevent the sunlight from directly shining on the car.

To use the multi-air-bag cover of the present invention, an air compressor 3 is used in cooperation with the cover. The air compressor 3 is positioned in the trunk 11 of the car 1 and is connected to the rear air bag 207 at the opening 232 of the air tube 23 by means of an inflation hose 4. Power from batteries of the car may be directly used to actuate the air compressor 3 and thereby inflates the air bags. The multi-air-bag cover 2 according to the present invention is flat in the form when it is not inflated and the air bags 201 to 207 can be sequentially overlapped with the rear air bag 207 being positioned at the bottom. The flattened and overlapped air bags 201 to 207 occupy only a very small room to be conveniently stored in the trunk 11.

Figure 3:
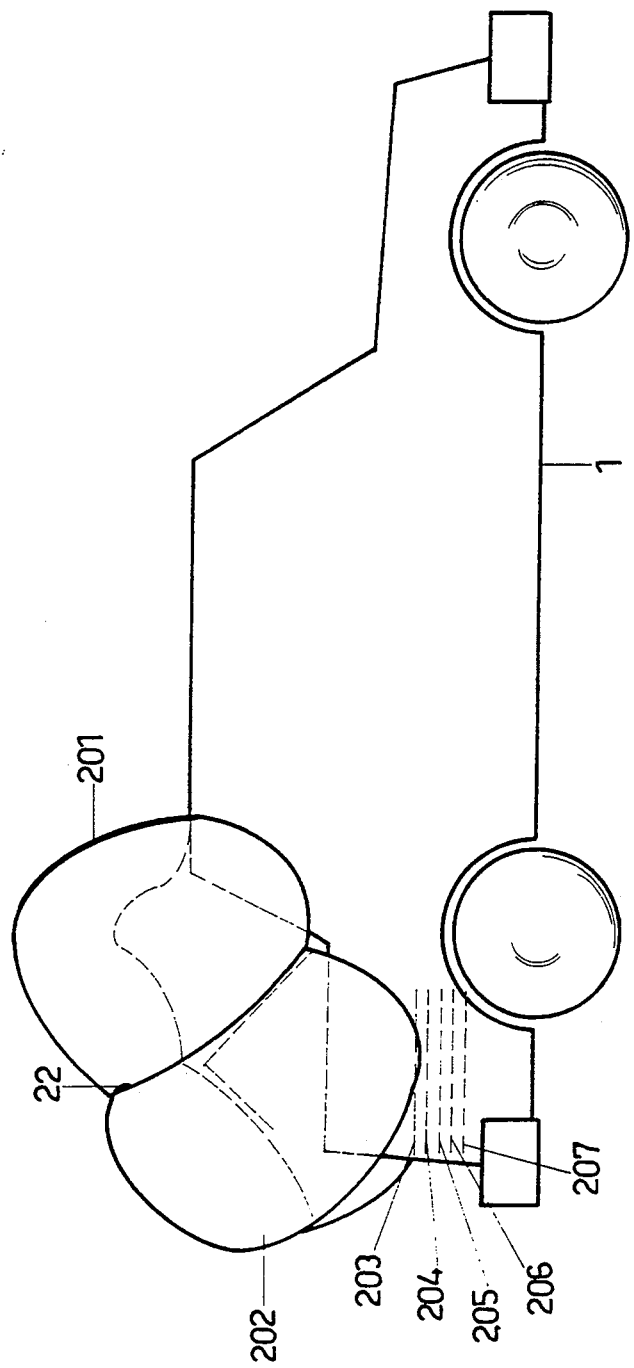
FIGS. 3 to 7 illustrate step by step the processes of using the present invention, from the inflation thereof to the completed cover of it over the car.
Figure 4:
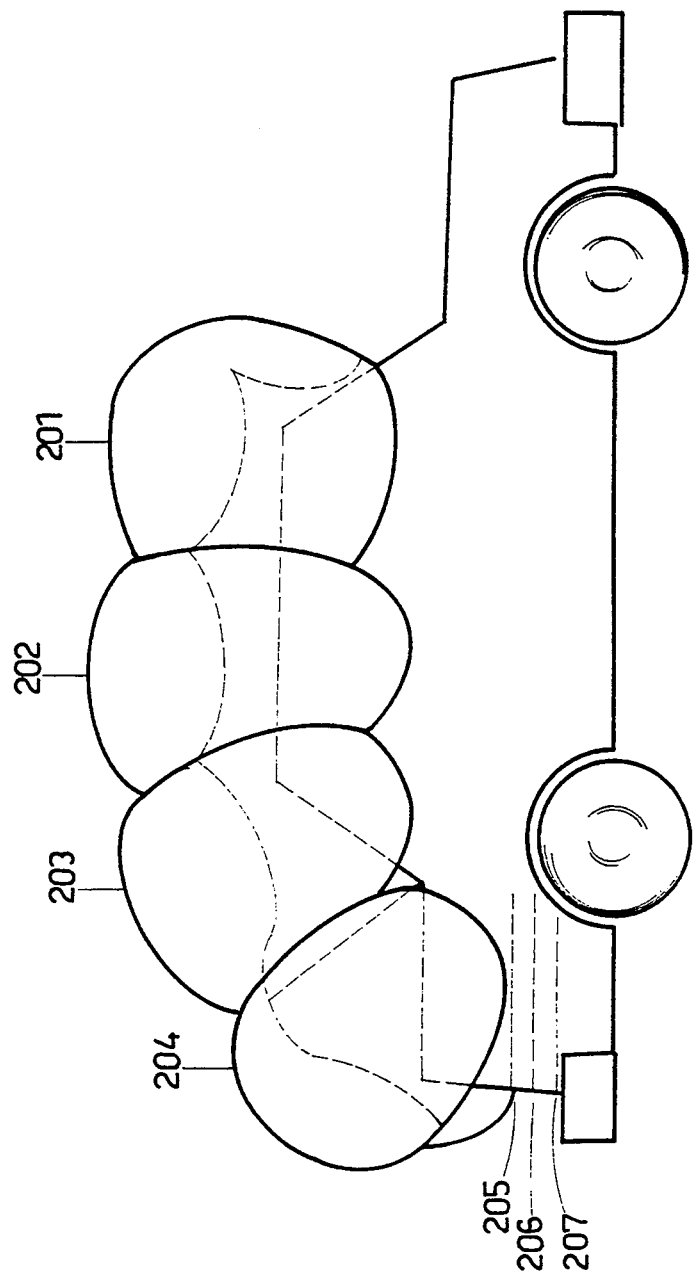
Figure 5:
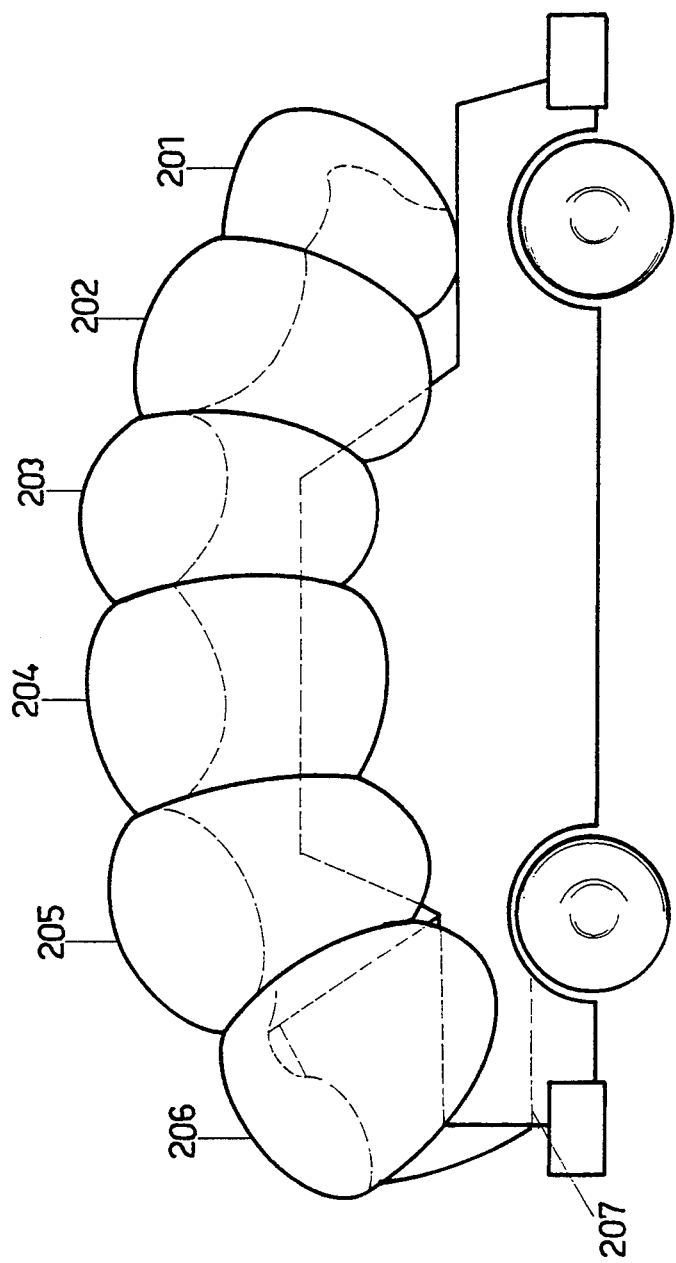
Figure 6:
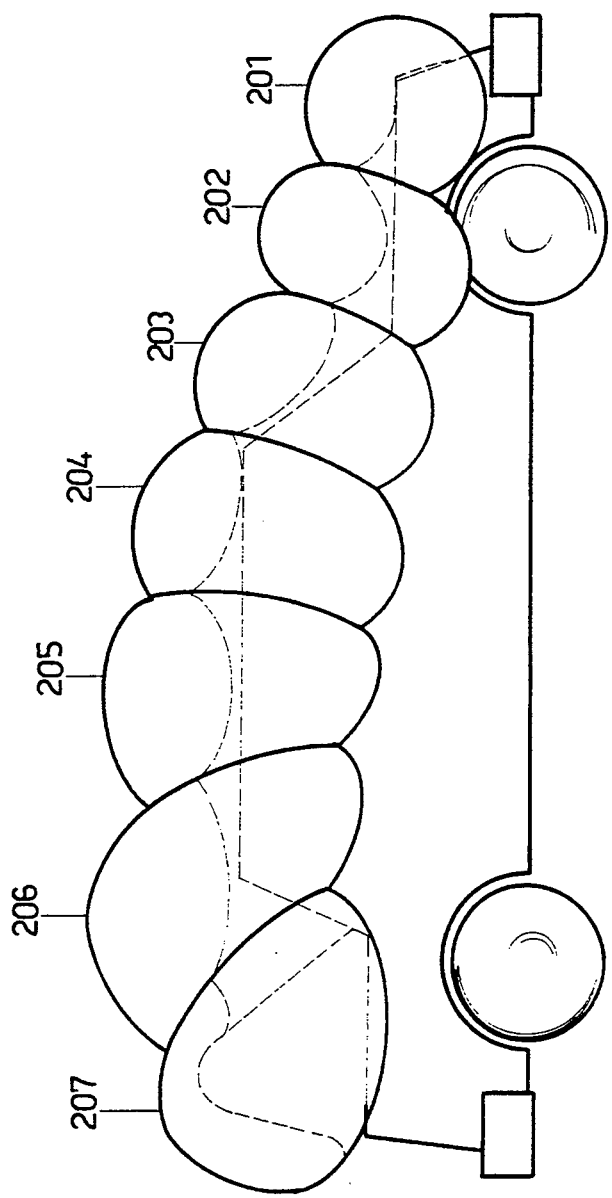
Figure 7:
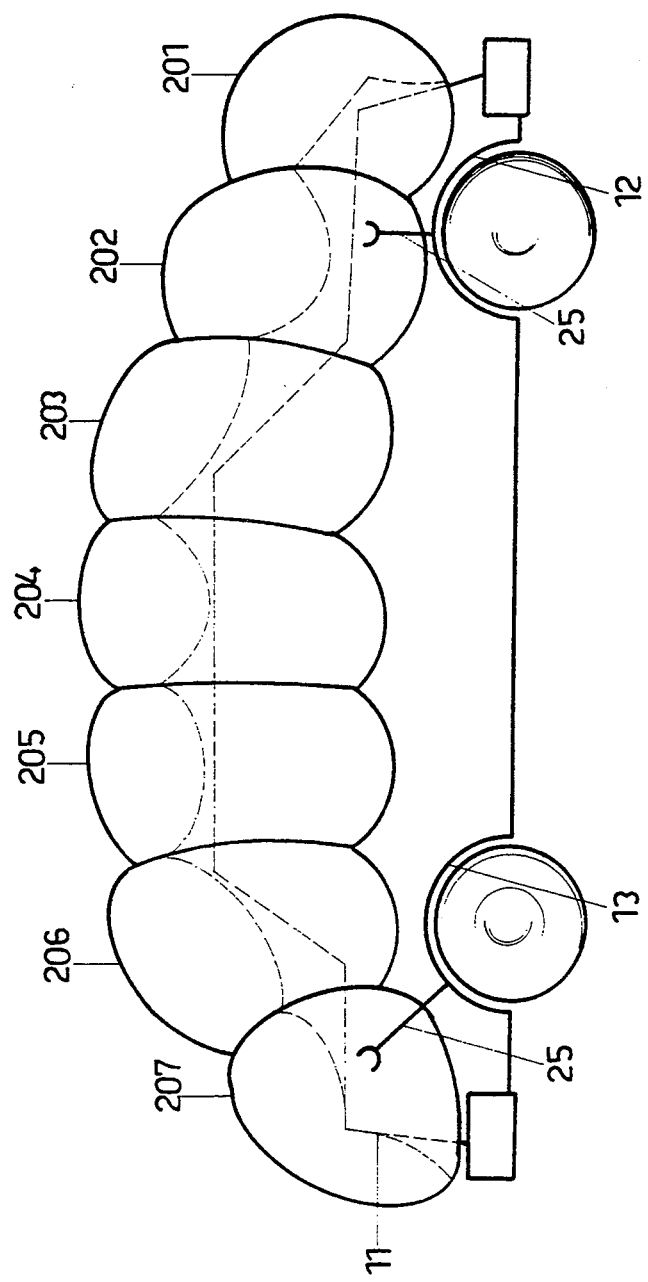

To use the multi-air-bag cover 2, first open the trunk 11, start the air compressor 3 to inflate the flattened air bags through the inflation hose 4 and the air tube 23. Since the other free end opening 231 of the air tube 23 is in the front air bag 201, the first air bag being inflated is the front air bag 201 which is positioned at the top of the overlapped air bags. Please refer to FIG. 3, when the front air bag 201 is inflated, the expanded volume thereof causes the front air bag 201 to automatically raise and move upward. When the front air bag 201 is inflated to reach a value of internal air pressure preset for the pressure valve 22 between the front and the second air bags 201, 202, the pressure valve 22 automatically opens for the compressed air to flow into the second air bag 202. When the second air bag 202 is inflated and expanded, it again automatically raises, moves upward, and push the first air bag 201 forward. Please refer to FIGS. 4, 5, and 6, the air bags 203, 204, 205, 206, and 207 are sequentially inflated and push the corresponding air bags before them forward. The user needs only to stand beside the trunk 11 to guide the elevated air bags to move toward the front of the car, and the entire cover 2 can smoothly cover the car 1, as shown in FIG. 6. When the rear air bag 207 is completely inflated, turn off the air compressor 3 in the trunk 11, close the trunk 11, and then fix the fenstening straps 25 provided at four corners of the cover 2 to the lower edges of the front and the rear mudguards 12, 13 by means of the hooks at free ends of the fastening straps 25, as shown in FIG. 7.

To deflate and fold the cover 2, simply discharge the air bags by sequentially opening the discharge valves 24 on the air bags, starting from the rear air bag 207 and finally the front air bag 201. When the air bags are sequentially discharged, the user needs only to slightly pull the flattened air bags backward to put the same into the trunk 11. Finally, close the trunk 11.

With the multi-air-bag cover 2 of the present invention, following effects can be achieved:

1. The entire cover is inflated to provide an expanded heat insulation space which enhances the insulation effect by preventing the strong sunlight from direct shining on the car. The cover can also be used as a dust cover. And, since the cover is formed from multiple pieces of individual air bags, the cover is strong in the structure while it is easily movable.

2. The inflated cover gives it a rounded configuration which is especially helpful in raining days, because the rain water will not directly fall on the car while the cover itself has better water repelling ability than the conventional car covers which will become wringing and wrinkled when being used in a raining day.

3. When any water or dust is found deposited on any recess on the car after the cover is removed, the inflation hose 4 may be used to blow away the water or dust.

4. The cover may be printed with different designs for advertisement purpose or eye-catching purpose.

5. The multi-air-bag cover of the present invention can be handled with little or no effort of the user. The inflated air bags will automatically and sequentially move forward to finally cover the car. When the cover is to be folded and stored, the sequential deflation of air bags from the rear air bag shall facilitate the easy pull of the first flattened air bags to the trunk.

6. With a car having a remotely controllable trunk, the trunk can be opened and the air compressor can be started as soon as the car has been parked, and therefore, the cover can be operated in a more convenient and time-saving manner.

What is claimed is:

1. An inflatable multi-air-bag cover for cars, comprising:
    a plurality of air bags which are arranged and heat-sealed together in parallel to each other and have two downward bent and extended sides, giving said cover a hood-like configuration;
    a pressure valve provided on each of said heat-sealed portions between every two of said air bags;
    a discharge valve provided on each of said air bags for separately discharging said air bags;
    an unperforated air tube being disposed inside said cover by passing through said air bags via heat-sealed portions between every two of said air bags; said air tube having a first end projecting out of one of said air bags located at a first end of said cover, and a second end extending into one of said air bags located at a second end of said cover; said first end of said air tube being detachably connected to an inflation hose connected to an air compressor for sending air into said air bag at said second end of said cover, such that said air bags are sequentially inflated by air passing through said pressure valves and finally form said hood-like cover to automatically cover a car; and
    fastening straps with hooking means connected to free ends thereof being provided at predetermined positions on said cover for securing said cover to said car.

* * * * *